United States Patent
Chatterjee et al.

(10) Patent No.: US 7,555,604 B2
(45) Date of Patent: Jun. 30, 2009

(54) METHOD AND STRUCTURE FOR AN IMPROVED DATA REFORMATTING PROCEDURE

(75) Inventors: Siddhartha Chatterjee, Yorktown Heights, NY (US); John A. Gunnels, Brewster, NY (US); Fred Gehrung Gustavson, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 11/328,344

(22) Filed: Jan. 9, 2006

(65) Prior Publication Data
US 2007/0162703 A1 Jul. 12, 2007

(51) Int. Cl.
*G06F 12/12* (2006.01)

(52) U.S. Cl. .................................................. 711/118
(58) Field of Classification Search ................ 711/118
See application file for complete search history.

(56) References Cited

U.S. PATENT DOCUMENTS 5,809,548 A * 9/1998 Chang et al. ................. 711/166
6,574,626 B1 * 6/2003 Regelman et al. ............ 707/6

* cited by examiner

*Primary Examiner*—Hyung S Sough
*Assistant Examiner*—Hamdy S Ahmed

(57) ABSTRACT

A method (and structure) of managing memory in which a low-level mechanism is executed to signal, in a sequence of instructions generated at a higher level, that at least a portion of a contiguous area of memory is permitted to be overwritten.

20 Claims, 7 Drawing Sheets

500

MATRIX OPERATION: C = C - A^T * B
j = 0, N-1, NB
i = 0, M-1, MB
l = 0, K-1, KB

MATRIX C
(ENTIRE MATRIX USUALLY STORED IN COLUMN MAJOR FORMAT)

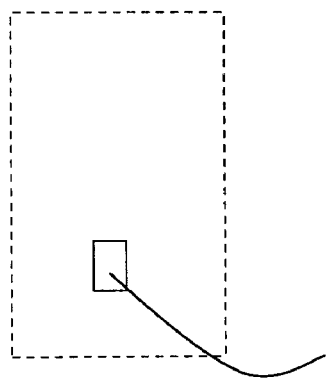

MB x NB SUBMATRIX:
C(i: i + MB-1, j:j+NB-1)

MATRIX A
(ENTIRE MATRIX USUALLY STORED IN ROW MAJOR FORMAT)

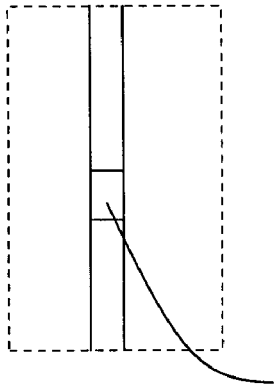

MB x KB SUBMATRIX:
A(l:l+KB-1, i:i+MB-1
OF BLOCK ROW VECTOR
A (0:KB-1, i:i+MB-1)

MATRIX B
(ENTIRE MATRIX USUALLY STORED IN COLUMN MAJOR FORMAT)

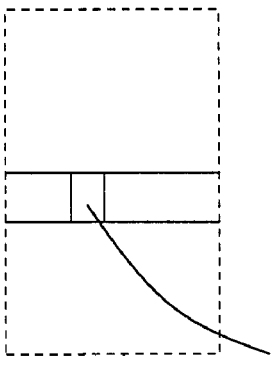

KB x NB SUBMATRIX:
B(l:l + KB-1, j:j+MB-1)
OF BLOCK COLUMN VECTOR
B(0:K-1, j:j+MB-1)

```
ZERO OUT BLOCK IN L1
CACHE FOR C (DCBZ COMMAND)
```

```
ZERO OUT BLOCK
IN L1 CACHE FOR C
(DCBZ COMMAND)
C = 0
```

FIGURE 7

METHOD AND STRUCTURE FOR AN IMPROVED DATA REFORMATTING PROCEDURE

U.S. GOVERNMENT RIGHTS IN THE INVENTION

This invention was made with Government support under Contract No. B517552 awarded by the United States Department of Energy. The Government has certain rights in this invention.

BACKGROUND OF THE INVENTION

1. Field of the Invention

The present invention generally relates to performance issues with computers. More specifically, an existing hardware mechanism (e.g., assembler level instruction) can be demonstrated to serve as a signal to a memory manager that a contiguous area of memory can be overwritten without first executing other procedures routinely imposed by conventional compilers. In an exemplary embodiment, the memory is L1 cache, the hardware mechanism can be the Data Cache Block Zero (DCBZ) or Data Cache Line Zero (DCLZ) command, and the operation is copying/reformatting/modifying data, including the transfer of data from L1 cache to main memory. Efficiency is achieved by avoiding superfluous retrieval of data before writing data from cache into a target area in main memory.

2. Description of the Related Art

The present invention addresses the issue of performance as related to copying/reformatting/modifying data. The techniques expressed herein can be applied to data stored in memory or on disk, such as data files or out-of-core (OOC) operations in the high performance computing (HPC) world.

The present invention is one example of addressing the more generic problem of improving computing efficiency by recognition that conventional methods for higher-level control of processing of application programs can often be inefficient because a compiler is designed to make "safe" decisions. That is, a compiler does not always provide efficient processing sequences because it implements processing with a micro view that lacks an awareness of the overall application's environment.

More specific to the present invention, as explained in more detail below, for LOAD and STORE instructions, a compiler works only with bytes, half words, words, and double words. Because the compiler cannot recognize what specific data is expected to change during the processing, it is designed to "play it safe" as it implements operations such as STORE, in which data is transferred from L1 cache into memory in units of a line of data. This ensures that data in the line that has not been changed during processing by the CPU is not lost or overwritten.

Accordingly, as the present inventors have recognized in working at improving efficiency of processing on the BlueGene/L® computer, a compiler will often implement lower-level machine instructions in a number of scenarios that cause inefficiencies in the processing of simple processing operations such as, for example, the simple WRITE (e.g., STORE) instruction in which a line of data is transferred from L1 cache into main memory.

A specific example related to the present invention is the task of writing data to a target memory location from L1 cache. It is typical that an application will want to store lines of cache into main memory at a different location from where the source data originally resided. During their development effort on the BlueGene/L, the present inventors have recognized that compilers often implement lower level instructions that inherently cause inefficiency in the storing process, when viewed from a higher perspective of efficiency that further considers the nature of the processing and whether data in a line must be protected from inadvertent loss.

To explain this problem in more detail and depending upon the specific computer architecture, a line of memory might consist of, for example, 128 bytes, with a word being four bytes long and a double word eight bytes long. Hence, in this architecture, a line contains 32 words or 16 double words. A compiler works with bytes, half words, words, and double words via LOAD and STORE instructions. In general, when a STORE is made from the L1 cache, the whole line must go to memory.

A simple source-to-target copy of data is considered in FIG. 1, initially, for the sake of simplicity, abstracting away from the possibilities of reformatting this source data during its storage in L1 cache.

As illustrated in FIG. 1, in step 101, the conventional process 100 reads data from a source area in main memory as a series of lines of memory and stores these lines into the L1 cache in increments of lines of data, using, for example, a stride-one DCopy command. "Stride-one" refers to data movement that is contiguous in memory. Since, in this first scenario, these lines of source data are not themselves reformatted by additional processing during their stay in L1 cache, they might be merely lines that have been retrieved as part of a larger body of source data that includes other lines that do undergo changes during processing by the CPU but are read into cache for purpose of, for example, allowing the line to be part of a display in a portion of a document being processed by a word processor.

A drawback to this conventional method is performance, since there are two reads 101, 102 and one write 103. The target is both read and written, as demonstrated in steps 102, 103. That is, the high-level compiler typically causes the contents currently stored in the target area of main memory to be first retrieved and brought into L1 cache as a routine initial step in the process of dispatching lines of L1 cache data to be written into the target area, typically because the compiler has been designed to protect the contents of the target area and/or portions of a cache line that do not get modified during processing.

The present inventors have recognized that such initial reading of data can be a source of computational inefficiency if it is not absolutely necessary (e.g., if the second data retrieval is superfluous for the specific type of processing being executed).

More generally, conventional memory management methods bring parts of a file into L1 cache as a series of lines. Thereafter, these lines may be either (a) unchanged, (b) reformatted, or (c) modified during their stay in the L1 cache before then being written to another main memory location that is part of the data structure or document file representing the final output of the copying/reformatting/modifying operation of the original file. The scenario in which the source lines of data themselves are modified by the CPU processing is exemplarily illustrated in the flowchart 200 of FIG. 2.

Again, as shown in step 204 of FIG. 2, data contents stored at the lines of the target location in main memory where the processed data is to be stored will be read into L1 (where the state of the data has nothing to do with the data that originally resided in the target location) as an initial step of the final storage operation, so that, then the relevant data in a copied/reformatted/modified state will be written back to this target area in step 205.

As part of the effort with the BlueGene/L program, the present inventors have recognized the inherent inefficiency of various conventional methods of executing even simple computer operations, such as the above-described process of writing data into main memory from L1 cache, as this process is typically implemented by high-level compilers. The concept is clearly more general than the specific case involving L1 cache and main memory.

This inefficiency in low-level execution of simple memory management can occur in almost any process being executed on a computer, including the operating system. But it is noted that it can be particularly useful for application programs of all types, including such routine applications as a word processor, wherein a document is being generated or edited via the CPU as a document data structure stored in main memory, using L1 cache as an intermediary storage during processing. Other exemplary applications are demonstrated in the management of memory for linear algebra processing, but it should be clear that the concept is more general than these non-limiting examples, once the exemplary embodiments of the following discussion are understood.

Thus, the present inventors have recognized that a need exists to improve processing efficiency in lower-level control of memory for even such simple tasks as copying/reformatting/modifying data.

SUMMARY OF THE INVENTION

In view of the foregoing, and other, exemplary problems, drawbacks, and disadvantages of the conventional system, it is a an exemplary feature of the present invention to provide a more efficient method wherein data from a local memory is written into a higher level of memory by using only one low-level read instruction and one low-level write instruction.

It is another exemplary feature of the present invention to demonstrate non-limiting exemplary scenarios in which a second reading of data is not necessary as a preliminary step to a STORE operation from L1 cache into memory, since, from a higher perspective, it can be ensured that no data is being lost or overwritten. That is, a compiler is capable of, but currently does not loop re-order and unroll by line size in sequential order on stores.

It is another exemplary feature of the present invention to demonstrate how superfluous retrievals of data can be eliminated to improve computation efficiency at the lower level below compiler instruction sequences.

It is another exemplary feature of the present invention to provide a technique in which one or more lower-level machine instructions can be used in a manner that eliminates the step of initially reading memory contents into L1 cache prior to the step of sending one or more lines of L1 cache contents to a target area in main or other higher level memory.

It is another exemplary feature of the present invention to provide a technique in which a potential inefficiency inherent in compilers is addressed by using one or more lower-level memory management commands to override the compiler's normal sequence in which data is read into L1 cache a second time as a preliminary step in storing data from L1 cache into a target memory location.

It is another exemplary feature of the present invention to provide a technique in which a potential inefficiency inherent in compilers is addressed by using one or more lower-level memory management commands to override the compiler's normal sequence in matrix algebra processing.

To achieve the above exemplary features and others, in a first exemplary aspect of the present invention, described herein is a method of managing a computer memory, including selectively executing a mechanism to signal, in a sequence of instructions generated at a higher level, that at least a portion of a contiguous area of memory is permitted to be overwritten.

In a second exemplary aspect of the present invention, described herein is an apparatus including at least one memory and a memory controller module. The memory controller is selectively signaled, using a memory command in a sequence of instructions generated at a higher level, that at least a portion of a contiguous area of a memory is permitted to be overwritten.

In a third exemplary aspect of the present invention, described herein is a signal-bearing medium tangibly embodying a program of machine-readable instructions executable by a digital processing apparatus to perform a method of perform a method of memory control for a memory, wherein at least one memory command is selectively executed as a signal, in a sequence of instructions generated at a higher level, that at least a portion of a contiguous area of the memory is permitted to be overwritten.

Thus, the present invention improves computational efficiency at a low level of memory management by providing a method to avoid superfluous retrieval of data into memory in any number of specific scenarios that include routine data storage into higher levels of memory, as well as specific data processing scenarios. The method can be used in applications programs but could also be incorporated as a basic memory management technique in an operating system or device drivers.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 5 shows an exemplary DGEMM matrix operation;

FIG. 6 shows in flowchart format 600 an exemplary second embodiment of the present invention in a first linear algebra DGEMM processing operation;

FIG. 7 shows in flowchart format 700 an exemplary third embodiment of the present invention in a second linear algebra DGEMM processing operation;

DETAILED DESCRIPTION OF EXEMPLARY EMBODIMENTS OF THE INVENTION

Figure 1:
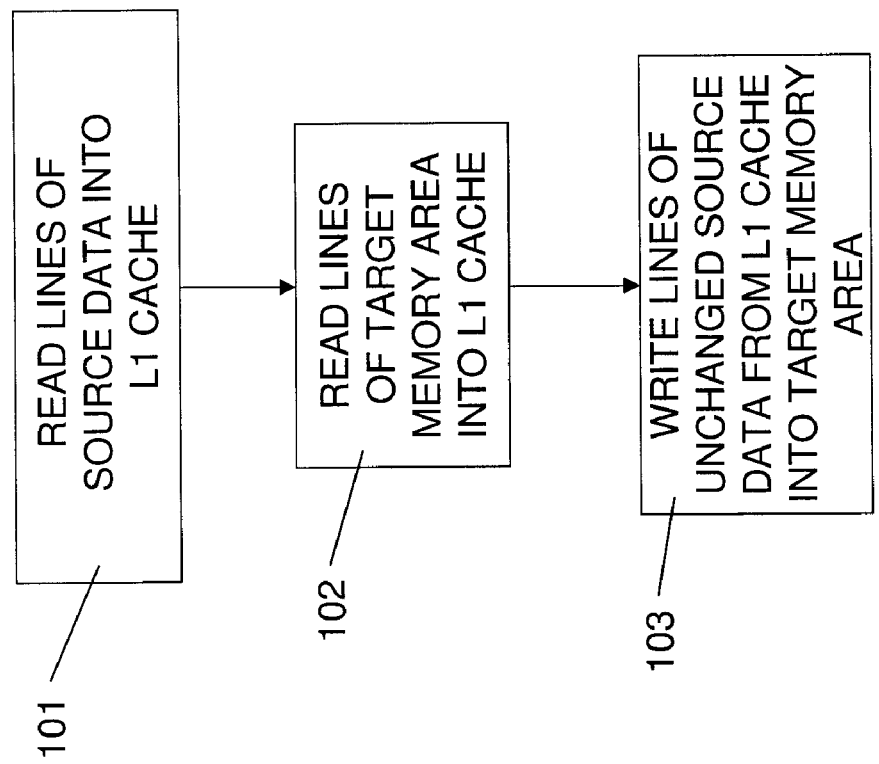
FIG. 1 shows in flowchart format 100 the process of the conventional method of storing contents of L1 cache into main memory in which the source data is not changed during its residency in L1 cache.
Figure 2:
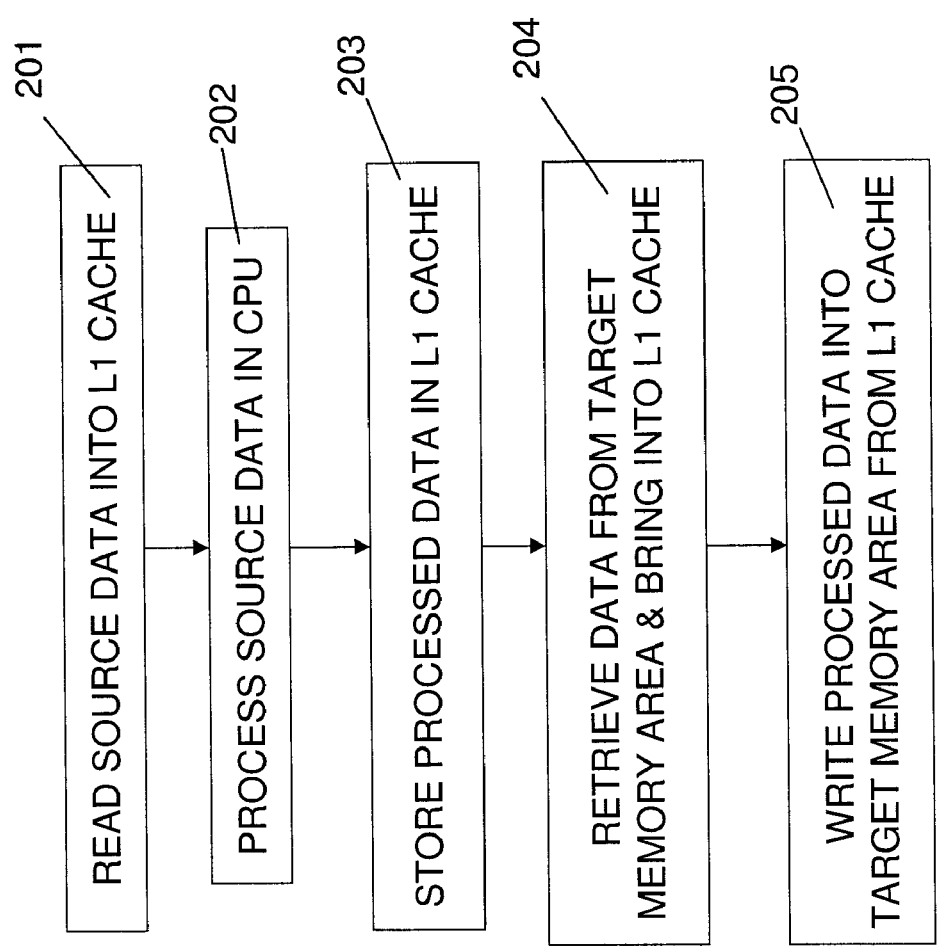
FIG. 2 shows in flowchart format 200 the more general scenario in which the source data is modified by processing during its residency in L1 cache.

Referring now to the drawings, and more particularly to FIGS. 3-7, exemplary embodiments of the present invention will now be described.

The present invention addresses performance issues related to copying/reformatting/modifying data. As mentioned above, the conventional method brings parts of the file into L1 cache as a series of lines. Then these lines may be: a) unchanged, b) reformatted, or c) modified during the time they reside in the L1 cache.

Ultimately, these lines will be written to another memory location, such as main memory, a higher level of cache memory, or secondary memory, that is used to store the data structure or file representing the final output of the copying/reformatting/modifying operation for data that involves, at least in part, the source data. In working on improving low-level instruction efficiency for the BlueGene/L computer, the present inventors recognized that moving contents from L1 cache into higher levels of memory could be a cause of inefficiency under some conditions, such as those in which a second retrieval of data is superfluous, given the overall perspective of the operation. More generally, the present inventors have recognized that data retrieval might be superfluous in various scenarios, including even scenarios in which even a first data retrieval is superfluous.

For example, since the target area is often not the source area from where the source data was initially retrieved, there exists a performance drawback when low-level instructions resulting from compiler commands that execute the memory storage mechanism cause, as an initial step in executing the low-level instructions, that the existing contents in the target memory location where the data is to be stored in memory is initially read into L1 (where the state of the data has nothing to do with the data that originally resided in the target location) so that data in a copied/reformatted/modified state can then be written to that target location.

Figure 3:
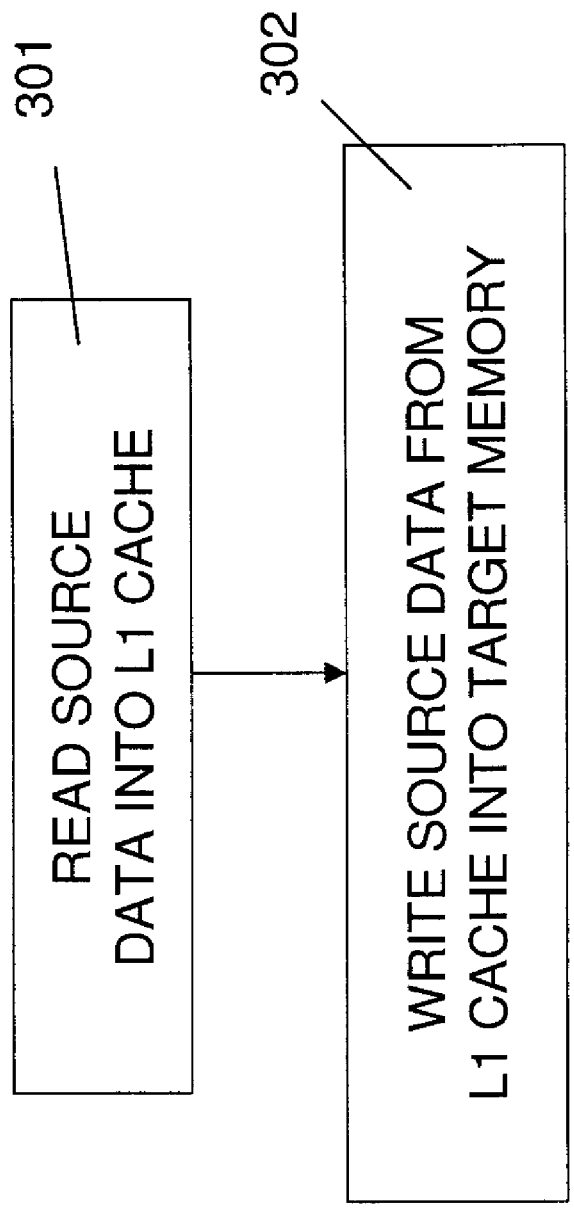
FIG. 3 shows in flowchart format 300 an exemplary generic process of the technique of the present invention, wherein the initial step of reading contents at target location in main memory is not executed.

Therefore, as shown in the flowchart 300 of FIG. 3 that demonstrates one exemplary generic concept of the present invention, the present inventors have recognized that the task of writing L1 cache contents to higher memory, using low-level instructions resultant from compiler implementation of the memory transfer, can be implemented with increased efficiency by using only one read 301 and one write 302 in the low-level instruction implementation, which, by the way, is minimal for most of today's processors.

It is clear that, assuming that loading and storing have the same cost, then savings in performance can approach 50% over the known solution. That is, the time required for the conventional method can be as much as 50% greater than the time required for the solution method described in the present invention.

In the context of the present invention, a data retrieval is considered "superfluous" if a data retrieval reads data into memory and this data is then subsequently overwritten without first using the retrieved data.

DCOPY Example

Figure 4:
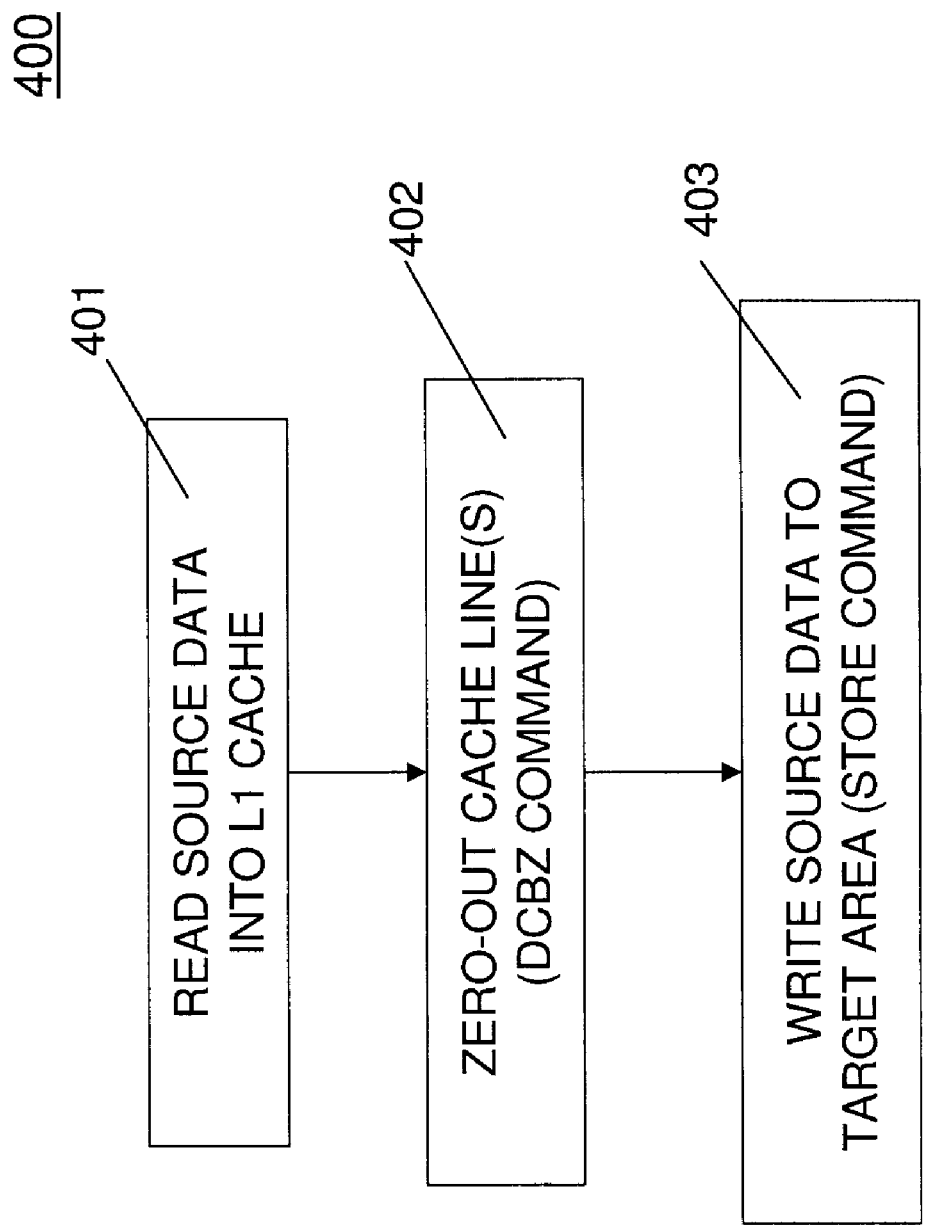
FIG. 4 shows in flowchart format 400 an exemplary first embodiment of the present invention, using the DCBZ lower level machine language command in a DCOPY operation.

In an exemplary straightforward case, exemplarily shown in flowchart format 400 in FIG. 4, the data written to the target location has nothing to do with the data that is in the target location at the beginning of the process. That is, this data is known to be all of the "don't care" variety, and so it does not matter that the original contents at the target memory location is simply overwritten. It should be clear that, in this case, retrieval of such "don't care" data at the target memory location is superfluous.

Therefore, in this scenario, the method of the present invention eliminates the initial read of the target area memory contents into L1 as part of the store process of the contents of L1 cache line (or lines) to the target area of memory. The elimination of the superfluous read is accomplished by issuing the DCBZ (or DCLZ) instruction in step 402. The DCBZ command zeros the target cache lines that would have been used for storing in cache the contents of the target memory area, and thereby obviates the need to load (read) the target lines as an initial step to the STORE process.

That is, the STORE command implemented by the compiler operates at a lower level, such as a byte, half word, word, or double word. In every case, a STORE command represents only part of the line that the cache memory manager will transfer as a unit into memory. However, to the cache memory manager, the integrity of the entire line is at stake. By issuing the DCBZ command, the cache memory manager is alerted that it is "okay" to "overwrite" the entire line and to proceed with the transfer into memory.

Hence, in contrast to the conventional method shown in FIG. 1 in which the memory line is initially retrieved a second time into cache as part of routine memory management induced by the compiler, the storing of the unmodified/reformatted/modified lines (presumed to be already in L1 cache or having just been placed there from the CPU in step 401) can be stored to its target in memory, in step 403, without having first read into cache the pre-existing contents at that target memory location. Assuming that loading and storing have the same cost, then savings in performance can approach 50% over the known solution.

In this first example, the improvement in efficiency is due to the elimination of the superfluous retrieval of data from main memory into L1 cache, a sequence that includes the factor of memory retrieval latency, in addition to the simple number of additional steps. The DCBZ step adds little latency or other overhead, since it is an instruction that is local to the cache itself. That is, one DCBZ command is equal to 128 STORE bytes of zero, which provides a clear improvement in computational efficiency.

It is noted that the invocation of the DCBZ command, as described above, is not presently a compiler capability, as compilers are currently designed. Therefore, it is necessary either to incorporate this command after compilation or to redesign the compiler to be able to recognize scenarios when DCBZ is appropriate.

Linear Algebra Subroutines

The next two examples of the present invention provide efficiency improvements in slightly different manner from that discussed above. These examples include reference to linear algebra subroutines such as contained in the computing standard called LAPACK (Linear Algebra PACKage). When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

One of the most heavily used type of level 3 L1 DGEMM kernel is a Double-precision A Transpose multiplied by B (DATB), that is, $C=C-A^T*B$, where A, B, and C are generic matrices or submatrices, and the symbology $A^T$ means the transpose of matrix A (e.g., see FIG. 5).

It is noted that the BlueGene/L computer has the processing of linear algebra applications as one of its design points.

DGEMM case a)

Therefore, in a second example demonstrating the present invention, simple matrix multiplication of the format $C=C+A*B$ is considered. Typically, in any high-performance implementation, some block of the C matrix (whose overall size is M×N; this block in the L1 cache will be considered as being of size m×n, where the dimensions are largely dictated by the size of the register file), is read into the registers, modified in accordance with the DGEMM operation ($C=C+A*B$), and written back out to the original C matrix.

It is that last step of writing the data back to memory that may induce performance shortfalls on modern computer architectures, as recognized by the present inventors during development of the BlueGene/L computer. The "DCBZing" of lines can be used again to great advantage in this case. A disadvantage is that this forces one to use m×n to be some multiple of the L1 cache size, as well as inducing related restrictions, or to code "very carefully".

As shown in FIG. 6, DCBZs are executed on the block of C, or even part of the block of C if that block is not of dimensions/position in memory so as to be amenable to a simple application of this idea. By doing this, it is avoided having to reload part of C into the L1 cache a second time, just to store a result that is no longer dependent upon that data.

This method is really only effective when enough of the A and B matrices would be brought through the L1 cache so as to "wash out" the m×n block of C. This scenario does happen in large matrix multiplications and in cases where one uses hardware features to set different residency policies for A, B, and C, which can be done on BlueGene/L.

For example, an m×n register block of C is first read into L1 cache to begin the DGEMM operation on that portion of the data. This C data consists of, say, 16 double words, or one line. This line will be forwarded from the L1 cache into 16 floating point registers (FPRs) of the processor in a transfer operation that places the data in the FPRs as C=T. The A and B data is then read to the L1 cache and other FPRs to update the T data as part of the DGEMM processing.

The problem recognized by the present inventors and addressed by the present invention is that, during the reading of the A and B data into L1 cache from memory, the original C data initially brought into L1 cache can get flushed out of cache. To be "safe", conventional low-level memory management requires that the original C data be read back into L1 cache because of this data flushing.

Clearly, in the case in which the 16 double words Ts from the DGEMM processing are to be stored over the Cs, the second reading of the Cs is not necessary.

To explain the last couple of paragraphs in more detail, in dealing with cache management, there are various replacement policies used to determine which line to replace when cache is full, including: least recently used (LRU), first in-first out (FIFO), and round-robin replacement (RR). Under the LRU policy, which is the policy currently preferred in computer architecture design, the line that was least recently accessed by a read or write would be the candidate for replacement.

The "wash out" effect for matrix operations that was mentioned above, more typically results when the FIFO and RR policies are used, more so than the LRU policy, but can occur in any of the three policies under the condition that the resultant m×n C matrix data (e.g., $C=C+A*B$) is "washed out" of L1 cache, but the higher-level operation considers that portions of the m×n C matrix data is still needed for the matrix operation. Thus, in a RR policy, the data in C gets flushed out in a fixed number of line loads.

In this scenario, the m×n C matrix data is superfluously brought back into L1 cache from main memory at least a second time during the processing. By using the zero-out technique shown in FIG. 6, having to reload part of C into the L1 cache a second time, just to store a result that is no longer dependent upon that data, is completely avoided.

Thus, the second example improves efficiency by again eliminating the superfluous loading of data from main memory and it again uses the DCBZ command, but it is applied in this case because of the specific scenario in DGEMM processing, a scenario in which the m×n C matrix data is not needed again in cache, as shown in the flowchart in FIG. 6.

DGEMM case b)

As a third non-limiting example of preventing superfluous loading of data into cache, in some versions of DGEMM, the operation being performed involves one or more scaling factors α, β, such as $C=\beta C+\alpha A*B$.

From this equation, if β=0, DGEMM performs the initial operation $C=\beta C=0$. In the scenario in which the memory locations where C currently resides might contain garbage, e.g., "Not A Number" (NaN's), M by N matrix C must be explicitly set to zero, to be then subsequently set to α·AB.

However, since 0·NaN=NaN and NaN≠0, what is being said is that multiplying the elements of C by zero is not okay in this case, since the result will not be zero, as required. That is, an NaN is not equal to zero.

Moreover, multiplying the elements, whether these element are NaN or otherwise, by zero is a costly solution anyway in terms of the number of steps in the process of multiplication by zero.

In any case, by again using the DCBZ instruction, one can reduce this special case of DGEMM processing to just M*N stores instead of M*N loads and stores. That is, instead of loading data and multiplying by zero, the DCBZ command can be used to set the initial zero, which then becomes the basis for modification by the α·AB processing.

Therefore, again, the use of the DCBZ instruction has eliminated the need for extraneous load operations, but in this case, it also serves the purpose of positively providing a zero in cache locations for the C block of data, as required for the specific case of the DGEMM operation involved, as shown in the flowchart of FIG. 7.

Demonstration of Coding

As mentioned above, since the compiler does not issue the above instructions, it is necessary to provide coding in the assembler, or to modify the compiler to incorporate the concepts of the present invention.

The C and assembly code below demonstrate the "DCOPY" example discussed above.

```
for(i = 0; i < (mainloop); i++)
{
    LFPDUX(f00, xin, sixteen);
    DCBZ(yout, sixteen);
    LFPDUX(f02, xin, thirtytwo);
    DCBZ(yout, fortyeight);
    LFPDUX(f04, xin, thirtytwo);
    DCBZ(yout, eighty);
    LFPDUX(f01, xin, minus48);
    DCBZ(yout, one12);
    LFPDUX(f03, xin, thirtytwo);
    DCBZ(yout, one44);
    LFPDUX(f05, xin, thirtytwo);
    DCBZ(yout, one76);
    LFPDUX(f06, xin, sixteen);
    STFPDUX(f00, yout, sixteen);
    LFPDUX(f08, xin, thirtytwo);
    STFPDUX(f02, yout, thirtytwo);
    LFPDUX(f10, xin, thirtytwo);
    STFPDUX(f04, yout, thirtytwo);
    LFPDUX(f07, xin, minus48);
    STFPDUX(f01, yout, minus48);
    LFPDUX(f09, xin, thirtytwo);
    STFPDUX(f03, yout, thirtytwo);
    LFPDUX(f11, xin, thirtytwo);
    STFPDUX(f05, yout, thirtytwo);
    STFPDUX(f06, yout, sixteen);
    STFPDUX(f08, yout, thirtytwo);
    STFPDUX(f10, yout, thirtytwo);
    STFPDUX(f07, yout, minus48);
    STFPDUX(f09, yout, thirtytwo);
    STFPDUX(f11, yout, thirtytwo);
}
```

Above, if one assumes that names correspond to byte offsets (e.g., one 12=112 bytes), the code is easy to understand. DCBZs are issued on L1 cache lines after appropriate loop peeling (not shown above). It is noted that "LFPDUX" stands for instruction "load floating point double, update pointer", and "STFPDUX" stands for "store floating point double, update pointer."

In the second example, involving "DGEMM," above, the approach can best be described in terms of loop versioning. Consider the following piece of pseudocode (which is, admittedly, somewhat inaccurate because it does not do the necessary loop peeling in order to establish alignments).

```
for(i = 0; i < M; i = i + m)
{
    for(j = 0; j < N; j = j + n)
    {
        load the (i, j)th mxn block of C in the registers
        for(l = 0; l < K; l = l + k)
        {
            Update the (i, j)th block of C by adding the
            A(i, l)*B(l, j) block
result to it
        }
        /* the loop versioning bit */
        if( (m*k + k*n) > L1_CACHE_SIZE) )
            DCBZ the location where the (i, j)th block will reside
        store the (i, j)the mxn block of C
    }
}
```

Out-of-Place Matrix Transposition

Another example of the usefulness of the present invention is an out-of-place matrix transposition. Let A be an m by n matrix with LDA$\geq$m, where "LD" stands for "leading dimension." If the transpose B=$A^T$, B is n by m, with LDB$\geq$n. Let LS be the line size and, assuming that there are $2LS^2$ floating point registers, it should be clear that the floating point registers can easily perform the transposition of matrix A. If there are not enough floating point registers, then the transposition must be done by register blocking, using two temporary arrays that each correspond to $LS^2$ registers. The DCBZ command can again be utilized to expedite this register blocking, as demonstrated by the sample coding.

The following code provides an example of the embodiment of the present invention for the out-of-place matrix transposition. That is, letting A be an m by n matrix with LDA$\geq$m, wanted is B=$A^T$. B is n by m, with LDB$\geq$n. Let LS be the line size and assume that there are $2LS^2$ floating point registers. If this assumption is not true then the transposition must be done by register blocking. The algorithm follows. For clarity, it is assumed that m and n are multiples of line size. It is noted that S and T are temporary arrays and each corresponds to $LS^2$ floating point registers.

```
DO j = 0, N-LS, LS
    DO i = 0, M-LS, LS
        Load A(i:i+LS-1, j:j+LS-1) into S(0:LS-1, 0:LS-1) stride 1
        T(0:LS-1, 0:LS-1) = S transpose
        DCBZ all lines of B corresponding to T
        Store T over B
    Enddo
Enddo
```

FIG. 7 illustrates a typical hardware configuration of an information handling/computer system in accordance with the invention and which preferably has at least one processor or central processing unit (CPU) 611.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

Figure 8:
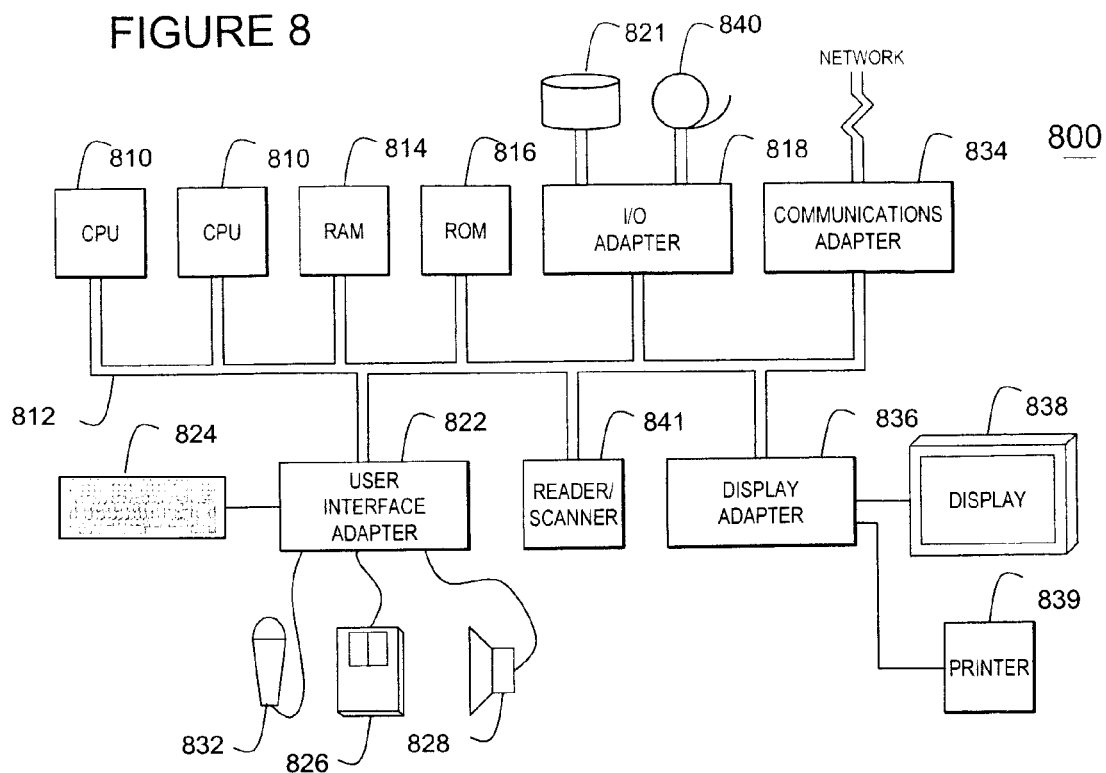
FIG. 8 illustrates an exemplary hardware/information handling system 800 for incorporating the present invention therein.
Figure 9:
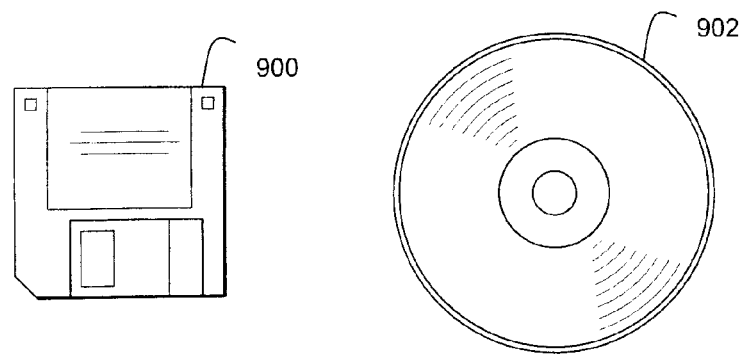
FIG. 9 illustrates a signal bearing medium 900 (e.g., storage medium) for storing steps of a program of a method according to the present invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

It is noted that one of ordinary skill in the art, after having read the details described herein, would readily be able to recognize the present invention as a more generic technique of improving overall processing efficiency by improving memory management. The generic concept involves using a lower-level instruction to signal that a contiguous block of data in a memory can be immediately overwritten, thereby eliminating one or more steps in a sequence of instructions generated by a higher-level compiler Although, in the discussion above, the main memory was considered the target memory and L1 cache was the source memory, it should be readily recognized by one of ordinary skill in the art, after taking this discussion as a whole, that the technique applies equally to other instances of memory transfer, such as cache-to-cache transfers, or transfers to secondary memory from main memory, etc., since the more generic concept is that a lower-level machine language instruction can be implemented to write lines of a first memory, such as L1 cache, into a target location of another level of memory without an initial step of reading the contents of the target location into the first memory.

It should also be recognized that, although two memories in a hierarchical memory structure are exemplarily discussed, the concept is more generic, since the two memories can overlap. That is, the present invention has application in scenarios in which a single memory is involved, and the lower-level mechanism is used to overwrite contiguous data from one section of that memory into another section of the memory or even scenarios in which a second data read from the same memory is eliminated.

It should also be recognized that the memory management technique of the present invention is also not limited to scenarios involving a single machine. Thus, for example, the present invention is also applicable for memory management between machines interconnected on a network, such as, for example, data transfers between a client and a server.

Finally, it is noted that the present invention involves management of a "data set" placed by the user in a memory of a computer as part of a processing by the computer. As such, this data set has a first word of data all the way through a last word of data. As one of ordinary skill in the art would recognize, this data set is typically not stored as a single contiguous area of memory, but rather, will be stored as a union of contiguous blocks of data that are linked together by the computer operating system to manage this data set in that memory.

In the various exemplary embodiments, the present invention involves data set storage in either or both of a source memory area and/or a target memory area, which source and target memory may overlap in some embodiments. From the previous paragraph, it is to be understood that the data set will, therefore, be stored in the source and/or target memory as a union of contiguous areas of data.

Thus, the present invention involves the process of using a mechanism to signal, in a sequence of instructions generated at a higher level, that at least a portion of this data set, managed by the operating system as a contiguous area of memory is permitted to be overwritten. However, since, in reality, as discussed above, the data set is actually broken down into a union of blocks of contiguous data by the memory manager, the mechanism, such as the DCBZ or DCLZ command, will selectively operate on each block of contiguous data, as appropriate, to involve the entire data set.

Therefore, as a generic description of the concept of the present invention, the signaling mechanism of the present invention can be described as operating on at least a portion of the data set in the source/target memory area, and it is to be understood that this portion will typically be at least one of these blocks of contiguous data that the memory manager manages as a union of contiguous data blocks to store the data set.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what we claim as new and desire to secure by Letters Patent is as follows:

1. A method of managing a computer memory, said method comprising:
    selectively executing an override mechanism to signal, in a sequence of higher-level instructions, that at least a portion of a contiguous area of memory is permitted to be copied over without preliminarily executing one or more procedures for said contiguous area of memory as normally would be executed in response to said higher-level instructions in an absence of said override mechanism.

2. The method of claim 1, wherein said memory comprises a first memory, said sequence of instructions comprises a data write operation wherein data from a second memory is to be written to a target location in said first memory, and said override mechanism eliminates a superfluous retrieval of data from said first memory into said second memory, said superfluous retrieval of data comprising a retrieval of data that is to be copied over and hence will no longer be used.

3. The method of claim 1, wherein said override mechanism comprises executing one of a DCBZ (Data Cache Block Zero) command and a DCLZ (Data Cache Line Zero) command.

4. The method of claim 3, wherein said one of DCBZ command and DCLZ command is implemented within a compiler-generated sequence of instructions for a data write process in which data is transferred to said contiguous area of memory.

5. The method of claim 4, wherein said one of DCBZ command and DCLZ command eliminates a superfluous data retrieval operation that comprises an initial step of a compiler-generated set of instructions for said data write process, said superfluous retrieval of data comprising a retrieval of data that is copied over without having been used.

6. The method of claim 4, wherein said one of DCBZ and DCLZ command eliminates a superfluous data retrieval in a compiler-generated set of instructions for a linear algebra processing operation, said superfluous retrieval of data comprising a retrieval of data that is copied over without having been used.

7. The method of claim 6, wherein said linear algebra processing operation comprises a DGEMM (Double-precision GEneralized Matrix Multiply) process.

8. The method of claim 6, wherein said one of DCBZ and DCLZ command is used for at least one of:
- precluding an operand in said linear algebra processing from being retrieved a second time during said processing;
- setting an operand in said linear algebra processing positively to a value of zero;
- substituting as a multiplication processing wherein a multiplier is zero; and
- a procedure used in an out-of-place matrix transposition process.

9. The method of claim 2, wherein said first memory comprises one of a higher-level cache, a main memory, and a secondary memory, and said second memory comprises an L1 cache.

10. The method of claim 1, wherein said mechanism is executed as part of a transfer of data between computers interconnected on a network.

11. The method of claim 1, wherein said mechanism is executed as part of a transfer of data within a single computer.

12. The method of claim 11, wherein said transfer of data occurs between two memories in two different levels of a hierarchical memory structure of said single computer.

13. An apparatus comprising:
- at least one memory; and
- a memory controller module for said at least one memory, wherein said memory controller module is selectively signaled, as an override mechanism using a low-level memory command in a sequence of instructions generated at a higher level, that at least a portion of a contiguous area of said at least one memory is permitted to be copied over without any preliminary operations normally executed for said higher level sequence of instructions in an absence of said low-level memory command being presented as said override mechanism.

14. The apparatus of claim 13, wherein said memory comprises one of cache, a main memory, and a secondary memory, and said at least one low-level memory command comprises one of a DCBZ (Data Cache Block Zero) and a DCLZ (Data Cache Line Zero) command related to an L1 cache.

15. The apparatus of claim 14, wherein said one of DCBZ and DCLZ command is implemented within a sequence of instructions for a data write process in which data is written into said at least one memory.

16. The apparatus of claim 14, wherein said one of DCBZ and DCLZ command is used for at least one of:
- precluding an operand in said linear algebra processing from being retrieved a second time during said processing;
- setting an operand in said linear algebra processing positively to a value of zero;
- substituting as a multiplication processing wherein a multiplier is zero; and
- a procedure used in an out-of-place matrix transposition process.

17. A storage medium tangibly embodying a program of machine-readable instructions executable by a digital processing apparatus to perform a method of memory control for a memory, said method of memory control comprising:
- selectively executing at least one low-level memory command to serve as an override signal, in a sequence of instructions generated at a higher level, that at least a portion of a contiguous area of said memory is permitted to be copied over without preliminarily executing one or more procedures for said contiguous area of memory as normally would be executed in response to said higher level instructions in an absence of said low-level memory command being presented as said override signal.

18. The storage medium of claim 17, wherein said memory comprises one of a cache, a main memory, and a secondary memory, and said at least one low-level memory command comprises one of a DCBZ (Data Cache Block Zero) and a DCLZ (Data Cache Line Zero) command.

19. The storage medium of claim 17, wherein said method of memory control is implemented as a part of a sequence of instructions in a data write process in which data is transferred to a contiguous region in said memory.

20. The storage medium of claim 17, wherein said method of memory control is used for at least one of:
- precluding an operand in a linear algebra processing from being retrieved a second time during said linear algebra processing;
- setting an operand in said linear algebra processing positively to a value of zero;
- substituting as a multiplication processing wherein a multiplier is zero; and
- a procedure used in an out-of place matrix transposition process.

* * * * *